US012695178B2

(12) United States Patent
Cherkaoui et al.

(10) Patent No.: US 12,695,178 B2
(45) Date of Patent: Jul. 28, 2026

(54) SYSTEM AND METHOD FOR DISTRIBUTED BEAMFORMING

(71) Applicant: MacDonald, Dettwiler and Associates Corporation, Sainte-Anne-de-Bellevue (CA)

(72) Inventors: Jaafar Cherkaoui, Sainte-Anne-de-Bellevue (CA); Amir Osseiran, Sainte-Anne-de-Bellevue (CA); Vladimir Glavac, Sainte-Anne-de-Bellevue (CA)

(73) Assignee: MacDonald, Dettwiler and Associates Corporation, Sainte-Anne-de-Bellevue (CA)

( * ) Notice: Subject to any disclaimer, the term of this patent is extended or adjusted under 35 U.S.C. 154(b) by 311 days.

(21) Appl. No.: 18/253,462

(22) PCT Filed: Nov. 24, 2021

(86) PCT No.: PCT/CA2021/051677
§ 371 (c)(1),
(2) Date: May 18, 2023

(87) PCT Pub. No.: WO2022/109733
PCT Pub. Date: Jun. 2, 2022

(65) Prior Publication Data

US 2025/0118889 A1 Apr. 10, 2025

Related U.S. Application Data

(60) Provisional application No. 63/117,616, filed on Nov. 24, 2020.

(51) Int. Cl.
*H01Q 1/28* (2006.01)

(52) U.S. Cl.
CPC .................................. *H01Q 1/288* (2013.01)

(58) Field of Classification Search
None
See application file for complete search history.

(56) References Cited

U.S. PATENT DOCUMENTS 6,879,576 B1 4/2005 Agrawal et al.
12,040,557 B1 * 7/2024 Sharma .................... H01Q 3/38
(Continued)

FOREIGN PATENT DOCUMENTS

EP 2369679 A1 9/2011
KR 20190022092 A 3/2019

OTHER PUBLICATIONS

International Search Report and Written Opinion issued in respect of corresponding PCT International Patent Application No. PCT/CA2021/051677, issued on Feb. 25, 2022.
(Continued)

*Primary Examiner* — Whitney Moore
(74) *Attorney, Agent, or Firm* — Own Innovation; James W. Hinton; Kent C. Howe

(57) ABSTRACT

Provided are a communication method, a terminal device and a network device. The terminal device receives configuration information sent by a network device, the configuration information being used for indicating one or more conditions for the terminal device to report random access-related information. The terminal device sends a successful handover report that does not contain the random access-related information to the network device in response to a random access of the terminal device not satisfying the one or more conditions for reporting the random access-related information.

20 Claims, 11 Drawing Sheets

(56) References Cited

U.S. PATENT DOCUMENTS

| | | | | |
|---|---|---|---|---|
| 2012/0213035 | A1 | 8/2012 | Yoo et al. | |
| 2012/0274507 | A1 | 11/2012 | Cherkaoui et al. | |
| 2019/0089434 | A1 | 3/2019 | Rainish et al. | |
| 2021/0211162 | A1 * | 7/2021 | Yeste Ojeda .......... | H04B 7/043 |

OTHER PUBLICATIONS

Melis, A. et al., "A Digital Beamformer for the PHAROS2 Phased Array Feed", Journal of Astronomical Instrumentation, vol. 9, No. 3, Oct. 13, 2020, 14 pages.
European Patent Office, Extended European Search Report issued on European Application No. 21896003.7, Sep. 26, 2024.

* cited by examiner

SYSTEM AND METHOD FOR DISTRIBUTED BEAMFORMING

TECHNICAL FIELD

The following relates generally to antennas and antenna assemblies for radio frequency (RF) communication, and more particularly to dual band radiating array antennas.

INTRODUCTION

As the number of connected devices and the need for communication between them continues to increase, along with the generation and proliferation of data generated by such devices, so too does demand for communications systems for facilitating such communication. One such manner of facilitating communication is with communications satellites. The market for communications satellites is set to explode as it becomes easier to launch satellites into space and the demand for satellite-based communication increases.

Communications satellites facilitate communications through onboard antennas. One such example of an antenna is an active direct radiating array antenna. It is important for such antennas to manage and balance size, mass, and power. It is often desired to have an antenna that may provide any one or more of reduced size, reduced mass, or reduced power consumption, or that may provide performance trade-offs while effectively managing the size, mass, and power of the antenna. For example, in spaceborne applications, the allocated overall weight for an antenna may be constrained, thereby limiting the number of radiating elements and the electrical efficiency of the antenna.

Accordingly, there is a need for an improved system and method for distributed beamforming that overcomes at least some of the disadvantages of existing systems and methods.

SUMMARY

Provided herein is a system for distributed beamforming. The system includes an onboard processor for processing radiofrequency beams. The onboard processor includes a plurality of beamforming integrated circuits for beamforming the beams. Each of the plurality of beamforming integrated circuits are communicatively connected. Each of the plurality of beamforming integrated circuits performs calculations for partially forming the beams and communicates the calculations for partially forming a beam to another of the beamforming integrated circuits. The plurality of beamforming integrated circuits performs calculations for completely form the beams. The onboard processor also includes a channelization integrated circuit for applying a channelization process to the beams. The plurality of beamforming integrated circuits are communicatively linked to the channelization integrated circuit. The system also includes radiating elements communicatively linked to the onboard processor for communication of the beams.

The system may provide that the radiating elements are configured for receiving the beams.

The system may provide that the channelization process includes digitizing the beams and demultiplexing the beams.

The system may provide that the beamforming integrated circuits are configured to demultiplex subchannels of the beams.

The system may provide that the radiating elements are configured for transmitting the beams.

The system may provide that the beamforming integrated circuits are configured to demultiplex channels of the beams.

The system may provide that the channelization process includes multiplexing the beams and converting the beams to analog.

The system may provide that the plurality of beamforming integrated circuits includes at least one redundant beamforming integrated circuit.

The system may also include a redundant channelization integrated circuit.

Provided herein is a method for distributed beamforming. The method includes partially calculating radiofrequency beams on each of a plurality of beamforming integrated circuits. The method also includes combining the calculation of each of the plurality of beamforming integrated circuits. The method also includes performing a channelization process on the beams.

The method may also include receiving the beams.

The method may provide that the channelization process includes digitizing the beams and demultiplexing the beams.

The method may also include demultiplexing subchannels of the beams with the beamforming circuits.

The method may also include comprising transmitting the beams.

The method may also include demultiplexing channels of the beams with the beamforming circuits.

The method may provide that the channelization process includes multiplexing the beams and converting the beams to analog.

The method may provide that the plurality of beamforming integrated circuits includes at least one redundant beamforming integrated circuit.

Provided herein is a system for performing distributed digital beamforming. The system includes radiating elements. The system also includes a first digital beamforming integrated circuit for generating a first partial beam information for a plurality of beams. The first digital beamforming integrated circuit is communicatively connected to the radiating elements for communication of the plurality of beams. The system also includes a second digital beamforming integrated circuit for generating a second partial beam information for the plurality of beams. The second digital beamforming integrated circuit is communicatively connected to the first beam forming integrated circuit to communicate the partial beam information. The system also includes the first digital beamforming integrated circuit configured to generate complete beam information for a first beam of the plurality of beams using the first partial beam information for the first beam and the second partial beam information for the first beam. The system also includes the second digital beamforming integrated circuit configured to generate complete beam information for a second beam of the plurality of beams using the first partial beam information for the second beam and the second partial beam information for the second beam.

The system may provide that the second digital beamforming integrated circuit sends second partial beam information of the first beam to the first digital beamforming integrated circuit.

The system may provide that the first digital beamforming integrated circuit sends the first partial beam information for a second beam to the second digital beamforming integrated circuit.

The system may also include a channelization integrated circuit for applying a channelization process to the plurality of beams. At least one of the first digital beamforming integrated circuit and the second digital beamforming integrated circuit is communicatively linked to the channelization integrated circuit.

The system may provide that the radiating elements are configured for receiving the plurality of beams.

The system may provide that the channelization process includes digitizing the beams and demultiplexing the beams.

The system may provide that the first digital beamforming integrated circuit and second digital beamforming integrated circuit are configured to demultiplex subchannels of the beams.

The system may provide that the radiating elements are configured for transmitting the plurality of beams.

The system may provide that the first digital beamforming integrated circuit and second digital beamforming integrated circuit are configured to demultiplex channels of the beams.

The system may provide that the channelization process includes multiplexing the beams and converting the beams to analog.

The system may also include at least one redundant digital beamforming integrated circuit.

The system may also include a redundant channelization integrated circuit.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

Figure 1:
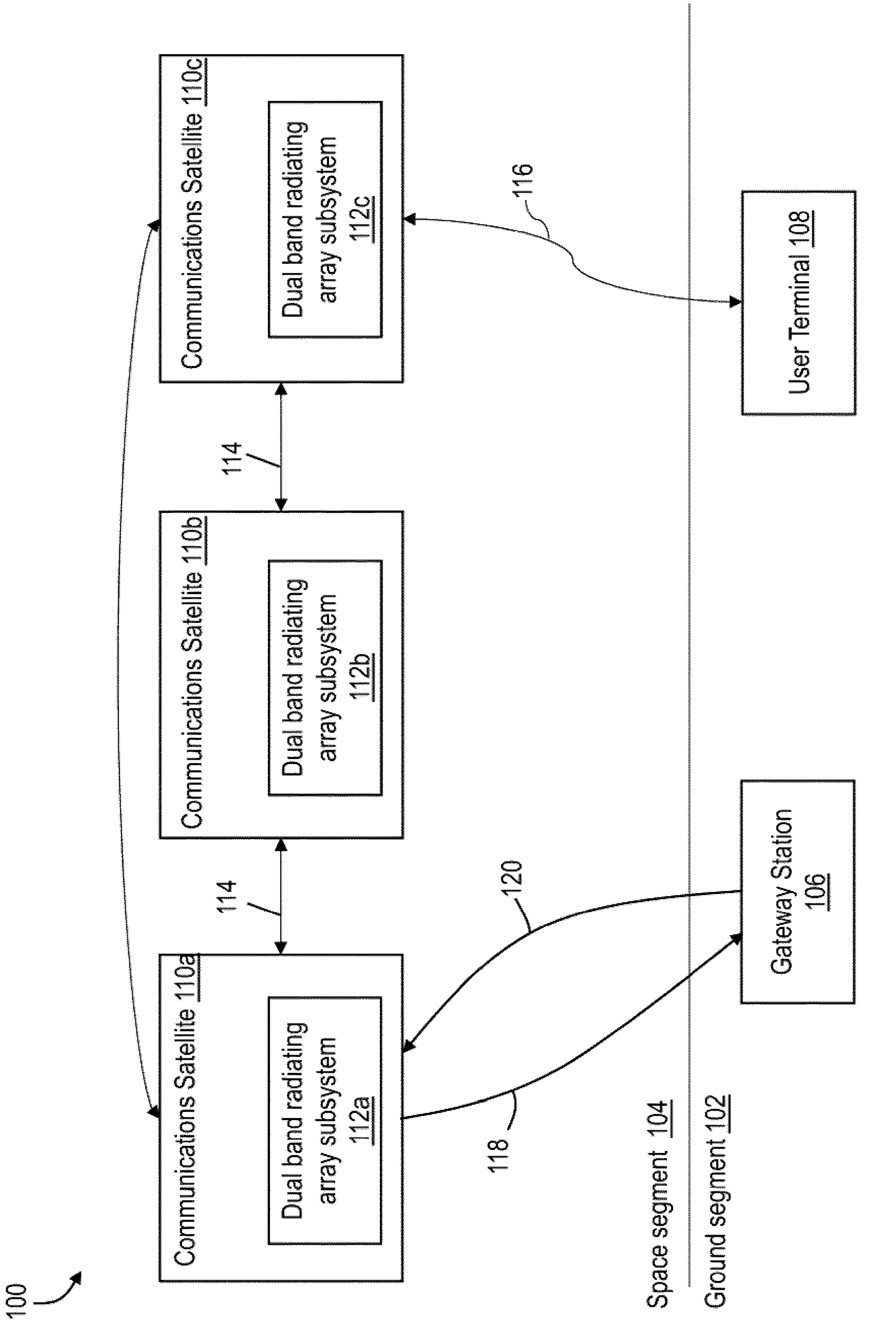
FIG. 1 is a block diagram of a satellite communication system including a plurality of satellites each having a dual band radiating array antenna subsystem, according to an embodiment.

Referring now to FIG. 1, shown therein is a system 100 for satellite-based communication, according to an embodiment.

The system 100 includes a ground segment 102 and a space segment 104.

The space segment 104 of system 100 includes communications satellites 110*a*, 110*b*, and 110*c*. Communications satellites 110*a*, 110*b*, 110*c* are referred to herein collectively as communication satellites 110 and generically as communication satellite 110.

It is to be understood that the system 100 may include any number of communication satellites 110 (i.e. one or more). In a particular embodiment, the satellite 110, without limitation, is a low-earth orbit (LEO) satellite. The satellite may be also be used in other orbits other than a LEO. In embodiments of the system 100 including a plurality of satellites 110, the satellites 110 may be referred to collectively as a satellite constellation or satellite network.

The communications satellites 110*a*, 110*b*, 110*c* each include a dual band radiating array subsystem (array subsystems 112*a*, 112*b*, 112*c*, respectively). Dual band radiating array subsystems 112*a*, 112*b*, 112*c* are referred to herein collectively as dual band radiating array subsystems 112 and generically as dual band radiating array subsystem 112.

The dual band radiating array subsystem 112 is configured to perform RF transmission in a first predetermined signal frequency band and RF reception in a second predetermined signal frequency band, wherein the first and second signal frequency bands do not overlap. The term "dual band" as used herein (such as to refer to the radiating array itself or to a radiating element thereof) thus refers to the ability of the radiating array antenna to transmit RF signals in a first predetermined signal frequency band ("transmit band") and receive RF signals in a second, different predetermined signal frequency band ("receive band"). The first and second signal frequency bands may correspond to designated satellite frequency bands. For example, in a particular embodiment, the array subsystem 112 may transmit RF signals in the S-band (approx. 2-4 GHz) and receive RF signals in the L-band (approx. 1-2 GHz). In another embodiment, the array subsystem 112 may receive RF signals in the S-band and transmit RF signals in the L-band. In some embodiments, the array subsystem 112 may receive and transmit RF signals at other frequencies with a substantially similar frequency ratio as receiving and transmitting S-band and L-band frequencies.

The dual band radiating array subsystem 112 includes a dual band radiating array antenna. The dual band radiating array antenna may be an active array (e.g. containing DC powered circuit, amplifiers, beamforming circuits, etc.). The dual band radiating array antenna is configured to perform digital beamforming.

Communications satellites 110*a*, 110*b*, and 110*c* communicate with one another via inter-satellite communication links 114.

The ground segment 102 includes a gateway earth station ("GES") 106 (or gateway station 106). The system 100 may include a plurality of gateway stations 106, which may be positioned at different locations.

Transmission of RF signals in a first frequency band from the gateway station 106 ("uplink") and reception of RF signals in a second frequency band at the gateway station 106 ("downlink") may be performed by different gateway stations 106 configured to operate in their respective signal frequency bands.

The gateway station 106 may be located on the surface of the Earth, in the atmosphere, or in space. The gateway station 106 may be fixed or mobile.

The gateway station 106, which may be surface-based or atmosphere-based, includes one or more devices configured to provide real-time communication with satellites 110.

The communications satellites 110 communicate with the gateway station 106 via communication downlink 118 and communication uplink 120. In FIG. 1, only communications satellite 110*a* is shown with communication links 118, 120, but it is to be understood that communications satellites 110*b*, 110*c* form similar communication links with the gateway station 106.

The gateway station 106 is configured to establish a telecommunications link 118, 120 with a satellite 110 when the satellite 110 is in "view" of the gateway station 106. The gateway station 106 transmits and/or receives radio ("RF") waves to and/or from the satellite 110. The gateway station 106 may include a parabolic antenna for transmitting and receiving the RF signals. The gateway station 106 may have a fixed or itinerant position.

The gateway station 106 sends radio signals to the satellite 110 (uplink) via communication link 120 and receives data transmissions from the satellite (downlink) via the communication link 118.

The gateway station 106 may serve as a command and control center for a satellite network (or "satellite constellation").

The gateway station 106 may analyze data received from the satellites 110 and/or may relay the received data to another location (i.e. another computer system, such as another gateway station 106) for analysis. In some cases, the gateway station 106 may receive data from the satellite 110 and transmit the received data to a computing device specially configured to perform processing and analysis on the received satellite data.

The gateway station 106 may further be configured to receive data from the satellite 110 and monitor navigation or positioning of the satellite 110 (e.g. altitude, movement) or monitor functioning of the satellite's critical systems (e.g. by analyzing data from the critical system being monitored).

The gateway station 106 may include any one or more of the following elements: a system clock, antenna system, transmitting and receiving RF equipment, telemetry, tracking and command (TT&C) equipment, data-user interface, mission data recovery, and station control center.

The ground segment 102 of system 100 also includes a user terminal 108.

The user terminal 108 may be a fixed or mobile terminal. The user terminal 108 may be any device capable of transmitting and/or receiving RF communication signals. The user terminal 108 includes an RF communication module for transmitting and/or receiving the RF signals. The user terminal 108 may be, for example, a computing device, such as a laptop or desktop, or a mobile device (e.g. smartphone).

The communications satellite 110*c* communicates with the user terminal 108 via communications link 116. Communications performed by satellite 110*c* via communications link 116 may include transmission and reception. While FIG. 1 shows communication link 116 established between the satellite 110*c* and the user terminal 108, it is to be understood that the user terminal 108 may establish a similar communication link with satellite 110*a* or 110*b*.

Similarly, the communications satellite 110*c* may establish similar communication links with other user terminals.

Figure 2:
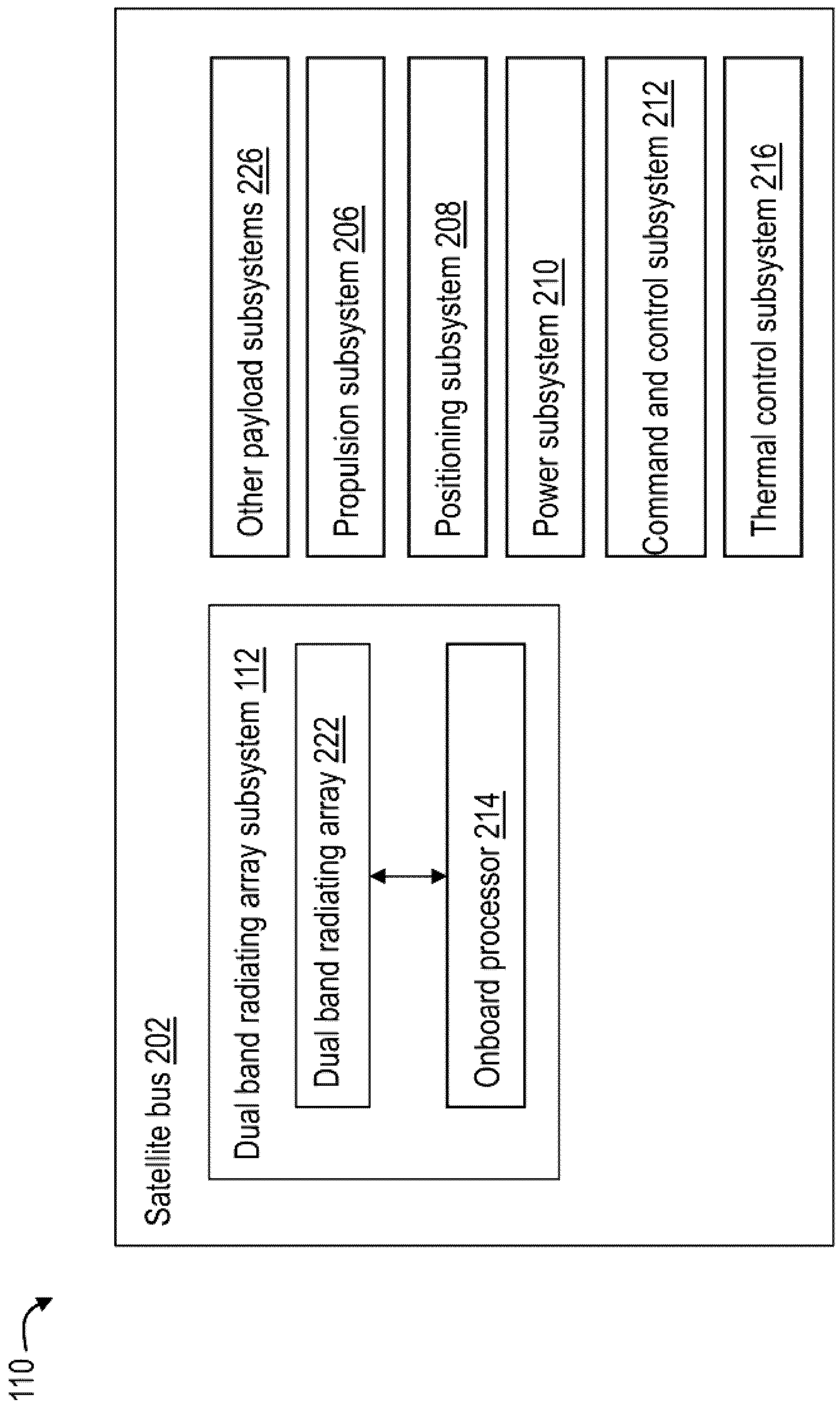
FIG. 2 is a block diagram of a communications satellite of FIG. 1, according to an embodiment.

Referring now to FIG. 2, shown therein is a communications satellite 110 of FIG. 1, according to an embodiment.

The communications satellite 110 includes a satellite bus 202. The satellite bus 202 provides the body of the satellite 110. The satellite bus 202 provides structural support and an infrastructure of the satellite 110 as well as locations for a payload (e.g. various subsystems, such as the DRA subsystem 112). Components of the communications satellite 110 may be housed within an interior of the satellite bus 202 or may be connected to an external surface of the satellite bus 202 (directly or indirectly through another component).

The communications satellite 110 includes a propulsion subsystem 206 for driving the communications satellite 110. The propulsion subsystem 206 adjusts the orbit of the satellite 110. The propulsion subsystem 206 includes one or more actuators, such as reaction wheels or thrusters. The propulsion subsystem 206 may include one or more engines to produce thrust.

The communications satellite 110 includes a positioning subsystem 208. The positioning subsystem 208 uses specialized sensors to acquire sensor data (e.g. measuring orientation) which can be used by a processing unit of the positioning subsystem 208 to determine a position of the satellite 110. The positioning subsystem 208 controls attitude and orbit of the satellite 110. The positioning subsystem 208 communicates with the propulsion subsystem 208.

Together, the positioning subsystem 208 and the propulsion subsystem 206 determine and apply the torques and forces needed to re-orient the satellite 110 to a desired attitude, keep the satellite 110 in the correct orbital position, and keep antennas (e.g. the dual band radiating array 222) pointed in the correct direction.

The communications satellite 110 includes an electrical power subsystem 210. The electrical power subsystem 210 provides power for the dual band array subsystem 112, as well as for other components. The power may be provided through the use of solar panels on the satellite bus 202 that convert solar radiation into electrical current. The power subsystem 210 may also include batteries for storing energy to be used when the satellite 110 is in Earth's shadow.

The communications satellite 110 includes a command and control subsystem 212. The command and control subsystem 212 includes electronics for controlling how data is communicated between components of the communications satellite 110. The propulsion subsystem 206, the positioning subsystem 208, and the power subsystem 210 may each be communicatively connected to the command and control subsystem 212 for transmitting data to and receiving data from the command and control subsystem 212.

The communications satellite 110 also includes a thermal control subsystem (or thermal management subsystem) 216. The thermal control subsystem 216 controls, manages, and regulates the temperature of one or more components of the communications satellite 110, such as signal amplification units of the radiating element module, within acceptable temperature ranges, which may include maintaining similar components at a generally uniform temperature. For example, the thermal control subsystem 216 may manage the temperature of components the subsystem 112 by managing heat generated by active heat sources (heat generating components) thereof. Generally, the thermal control subsystem 216 protects electronic equipment of the dual band array subsystem 112 from extreme temperatures due to self-heating of the dual band array subsystem 112 (i.e. by operation of the signal amplification components of the dual band array subsystem). The thermal control subsystem 216 may include active components or passive components.

The communications satellite 110 may also include other payload subsystems 226. The other payload subsystems 226 may include any one or more of optical intersatellite terminals, gateway antennas, filters, cables, waveguides, etc.

The communications satellite 110 includes a dual band array subsystem 112. The dual band array subsystem 112 includes a dual band radiating array 222 and an onboard processor ("OBP") 214. The dual band radiating array 222 is communicatively connected to the OBP 214. The OBP 214 may be part of the satellite's payload.

The OBP 214 performs the digital beamforming (Rx and Tx digital beamforming) and channelization. On the forward link, the signal received is digitized, the channels are demultiplexed and sent to the processor for beamforming, conversion to analog and distribution to the transmit antenna elements. On the return link, the signals received from the receive antenna elements are digitized, subchannels are demultiplexed and beams are formed by the processor. The obtained beam signals are multiplexed, converted to analog and sent to the downlink.

The digital beamforming operations performed by the OBP 214 allow for the array of dual band RF radiating elements to be steered to transmit RF signals in a specific direction and minimize radiated power in other directions (the antenna can null certain directions to prevent interference). Each radiating element in the array may be fed separately with the signal to be transmitted. The phase, and possibly the amplitude, of each signal is then added constructively and destructively in such a way that the energy is concentrated into a narrow beam or lobe and minimized in other directions. Controlling the amplitude may be optional in some designs.

The dual band array 222 is both a receive (Rx) antenna and a transmit (Tx) antenna. In variations, the communications satellite 110 may have a plurality of dual band array assemblies 222 or dual band array subsystems 112. The number of dual band array subsystems 112 or dual band array assemblies on the communications satellite 110 is not particularly limited.

The dual band array 222 transmits an electromagnetic RF signal within a first predetermined signal frequency band and receives an electromagnetic RF signal within a second predetermined signal frequency band. The dual band array assembly may be configured to use a subset of the overall signal frequency band.

Figure 3:
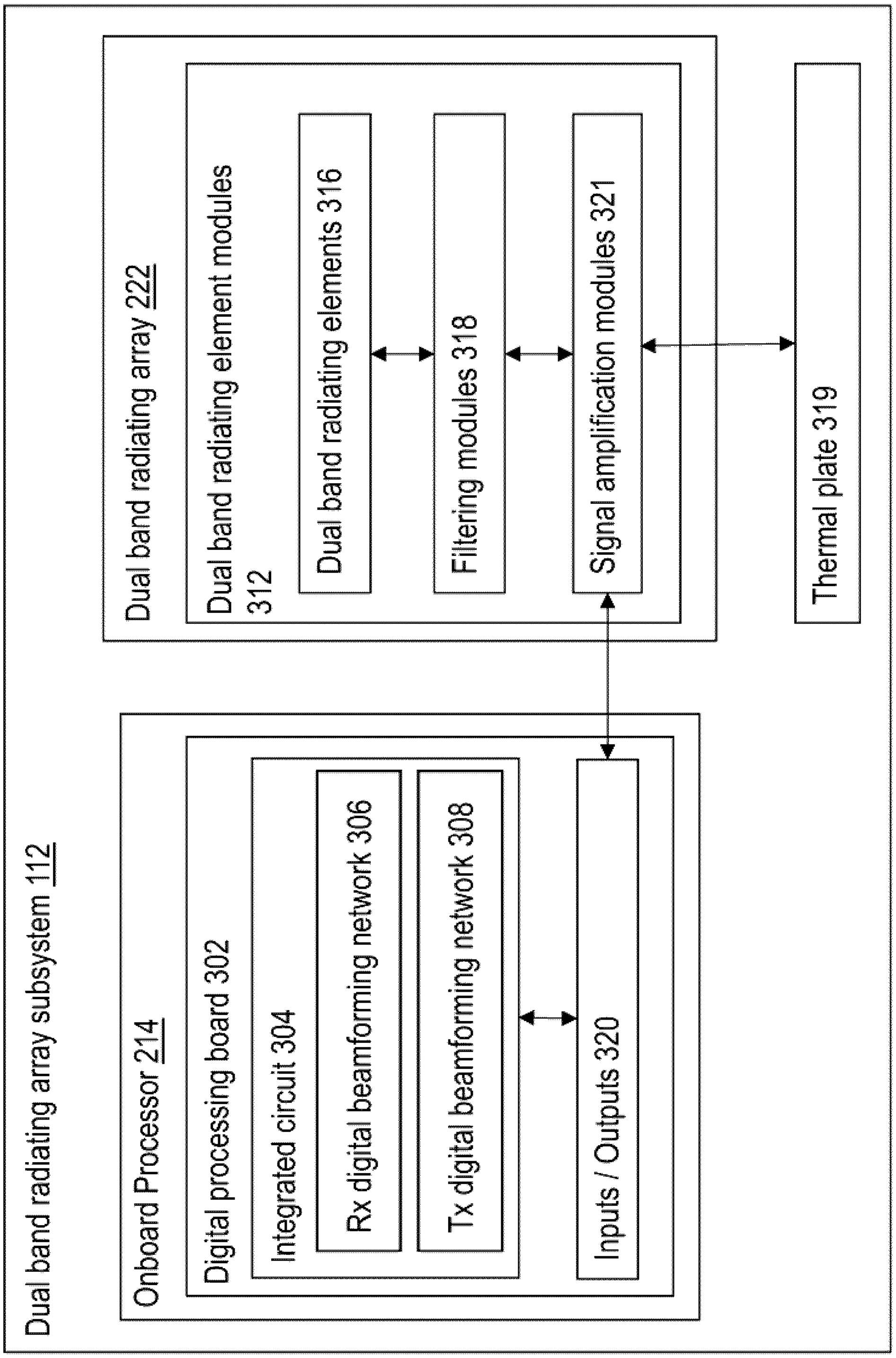
FIG. 3 is a block diagram of the dual band radiating array subsystem of FIG. 2, according to an embodiment.

Referring now to FIG. 3, shown therein are the dual band array 222 and OBP 214 of FIG. 2 in greater detail, according to an embodiment.

Generally, the dual band radiating array 222 is a phased array antenna including a collection of antenna or radiating elements 316 (described below) assembled together such that the radiation pattern of each individual radiating element 316 constructively combines with neighboring radiating elements 316 to form an effective radiation pattern called a main lobe. The main lobe transmits radiated energy in a desired location while the dual band array is designed to destructively interfere with signals in undesired directions, forming nulls and side lobes. The dual band array subsystem 112 may be designed to maximize the energy radiated in the main lobe while reducing energy radiated in the side lobes to an acceptable level. The direction of radiation may be manipulated by changing the phase of the signal fed into each radiating element 316. The result is that each radiating element 316 in the array 222 has an independent phase and amplitude setting to form a desired radiation pattern.

The dual band array 222 includes a plurality of radiating element modules 312. Each radiating element module 312 includes a radiating element 316 for transmitting and receiving RF energy, a filtering module 318 (a combined unit) for filtering RF signals, and a signal amplification module 321 for performing signal amplification on RF signals.

Each radiating element 316 is a basic subdivision of the antenna 222, which is itself capable of radiating or receiving RF energy.

The radiating element 316 is a dual band radiating element capable of transmitting an RF signal of a first frequency band and receiving an RF signal of a second frequency band.

The radiating element 316 may be a dual band self-circular polarization (self-CP) patch radiating element. The EM wave generated by the self-CP patch radiating element is circularly polarized. In another embodiment, the circular polarization is generated in a patch antenna using a feed network. The feed network patch may offer better a axial ratio (quality of the circularly polarized signal) at the expense of more design complexity and circuitry behind the patch. The self-CP patch may be more simple to implement but may not achieve as good of an axial ratio In an embodiment, the radiating element 316 includes a first radiating patch and a second radiating patch. The first radiating patch is configured to transmit an RF signal of a first signal frequency band (e.g. S-band). The second radiating patch is configured to receive an RF signal of a second signal frequency band (e.g. L-band). The first and second radiating patches may configured be in a stacked patch configuration, wherein one radiating patch (e.g. first radiating patch) is disposed on top of the other radiating patch (e.g. second radiating patch). For example, in an embodiment, the first radiating patch (Rx) may be used as the ground plane for the second radiating patch (Tx).

The radiating element 316 includes an input connection and output connection for receiving signals from and transmitting signals to the filtering module 318, respectively.

The filtering module 318 includes a receive filter unit and a transmit filter unit for filtering Rx and Tx signals, respectively. The filtering module 318 includes input and output connections for receiving signals from and transmitting signals to the radiating element 316. The filtering module 318 also includes input and an output connections for receiving signals from and transmitting signals to the signal amplification module 321.

The signal amplification module 321 includes an Rx signal amplification unit (e.g. low noise amplifier or "LNA") and a Tx signal amplification unit (e.g. solid-state power amplifier or "SSPA") for performing signal amplification on Rx and Tx signals, respectively.

The signal amplification module 321 includes input and output connections for receiving filtered signals from and transmitting signals (to be filtered) to the filtering module 318. The signal amplification module 321 routes filtered signals received from the filtering module 318 to the Rx amplification unit for amplification. The signal amplification module 321 routes amplified Tx signals from the Tx amplification unit to the filtering module 318.

The signal amplification module 321 also includes input and output connections for receiving signals (for amplification) from and transmitting amplified signals to the digital processing board (described further below) to which the radiating element module 312 is connected. The signal amplification module 321 is thus configured to route signals received from the digital processing board to the Tx amplification unit for signal amplification and to route amplified Rx signals from the Rx amplification unit to the digital processing board.

The OBP 214 includes one or more digital processing boards 302. FIG. 3 illustrates a representative digital processing board 302 but it is to be understood that in variations of the dual band array subsystem 112, the OBP 214 includes a plurality of digital processing boards 302 and the number of digital processing boards 302 is not particularly limited. In an embodiment with one digital processing board 302, each of the radiating elements 316 in the array 222 is connected to and serviced by the digital processing board 302. In embodiments using a plurality of digital processing boards 302, each of the digital processing boards is connected to and services a subset of the total number of radiating elements 316 in the array 222. The subsystem 112 may be configured such that each of the plurality of digital processing boards 302 is communicatively connected to and services the same (or approximately the same) number of radiating elements 316. The number of digital processing boards 302 in the subsystem 112 may be determined based on the number of input and output ports available on the digital processing board 302 (which would limit the number of radiating elements 316 that can be connected to the board 302).

Each digital processing board 302 may have a "prime" digital processing board and a "redundant" digital processing board (which is, in effect, a duplicate of the prime).

Digital boards 302 may be distributed as tiles with each board configured to service a subset of the radiating elements 316 (receive and transmit). This configuration of digital processing boards 302 may advantageously simplify beamforming complexity of the array and interconnectivity within the array.

The digital processing board 302 includes an integrated circuit 304. In an embodiment, the integrated circuit 304 is a field programmable gate array ("FPGA"). The integrated circuit 304 includes an Rx digital beamforming network 306 and a Tx digital beamforming network 308. The digital beamforming networks 306, 308 perform digital beamforming operations for Rx and Tx operations, respectively.

The digital processing board 302 also includes a plurality of input connections and output connections 310. The inputs/outputs 320 facilitate communication between the digital processing board 302 and the radiating element modules 312. In particular, the inputs/outputs 320 include an output connection for routing an output of the Tx beamforming network 308 to the signal amplification module 321 of the radiating element module 312 and an input connection for receiving an amplified Rx signal from the signal amplification module 321 and routing the Rx signal to the Rx digital beamforming network 306 for signal processing.

In some cases, the digital processing board 302 may receive beamforming information (e.g. partial beamforming information) from or provide beamforming information to another digital processing board 302 in the subsystem 112. The OBP 214 may thus be configured to perform distributed digital beamforming using multiple digital processing boards 302.

The radiating array subsystem 112 also includes a thermal plate 319. The thermal plate 319 is disposed between the signal amplification modules 321 of the radiating array 222 and the digital processing boards 302 of the OBP 214. For example, the signal amplification modules 321 and digital processing boards 302 may be mounted to opposing sides of the thermal plate 319. The thermal plate 319 is adapted to passively transfer heat generated by heat generating components of the array subsystem 112 (e.g. integrated circuits 304, signal amplification modules 321) away from the center of the array 222 and towards the sides.

In an embodiment, the thermal plate 319 includes a panel of material having good thermal conductivity and a plurality of oscillating heat pipes embedded in the panel.

The thermal plate 319 includes a surface onto which spacecraft heat pipes can be mounted to provide a thermal interface for heat exchange from the thermal plate 319 to the spacecraft heat pipes.

Figure 4A:
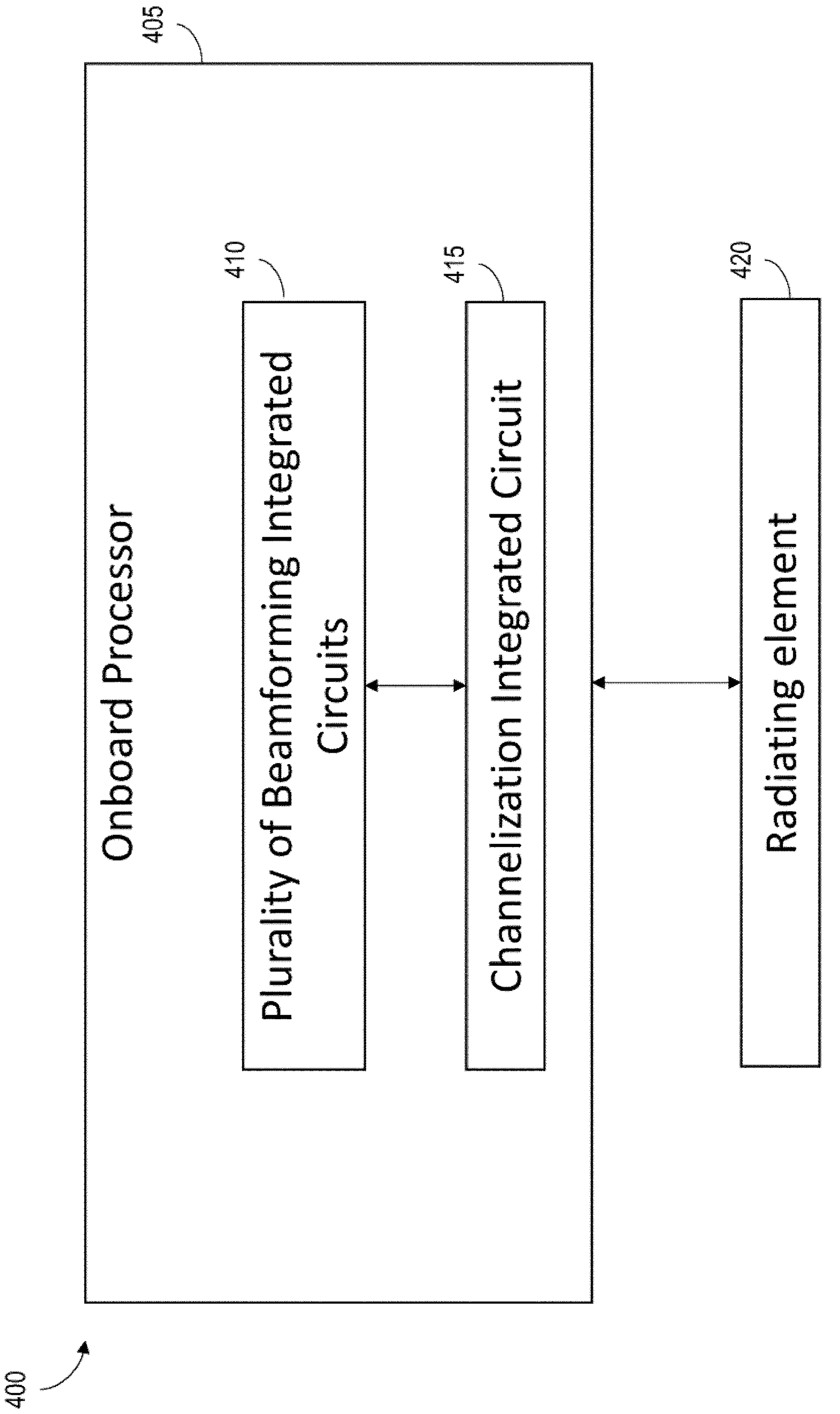
FIG. 4A is a block diagram of a device for distributed beamforming a radio signal, according to an embodiment.

Referring to FIG. 4A, illustrated therein is a block diagram of a device for distributed beamforming a radio signal, according to an embodiment. The device 400 includes an onboard processor 405 communicatively linked to a radiating element 420 for communicating a beam of a radiofrequency between the radiating element 415 and the onboard processor 405. The onboard processor 405 is for processing the beam. The onboard processor 405 includes a plurality of beamforming integrated circuits 410. Each of the plurality of beamforming integrated circuits 410 are communicatively connected.

Each of the plurality of beamforming integrated circuits 410 may be connected to one another in a sequence and each of the plurality of beamforming integrated circuits 410 may be connected to multiple other beamforming circuits. Each of the plurality of beamforming integrated circuits 410 performs calculations for partially forming a beam and communicates the calculations to another of the beamforming integrated circuits 410. The plurality of beamforming integrated circuits 410 performs calculations to completely form the beams. The plurality of beamforming integrated circuits 410 are communicatively connected to a channelization integrated circuit 415 for performing a channelization process on the completely formed beams.

In some embodiments, if the onboard processor processes a return link, performing a channelization process includes multiplexing a completely formed beam. In some embodiments, when the onboard processor processes a forward link, performing a channelization process includes demultiplexing an input signal. In an embodiment, the plurality of beamforming circuits and channelization integrated circuit are seven FPGA boards with reconfigurable firmware.

Figure 4B:
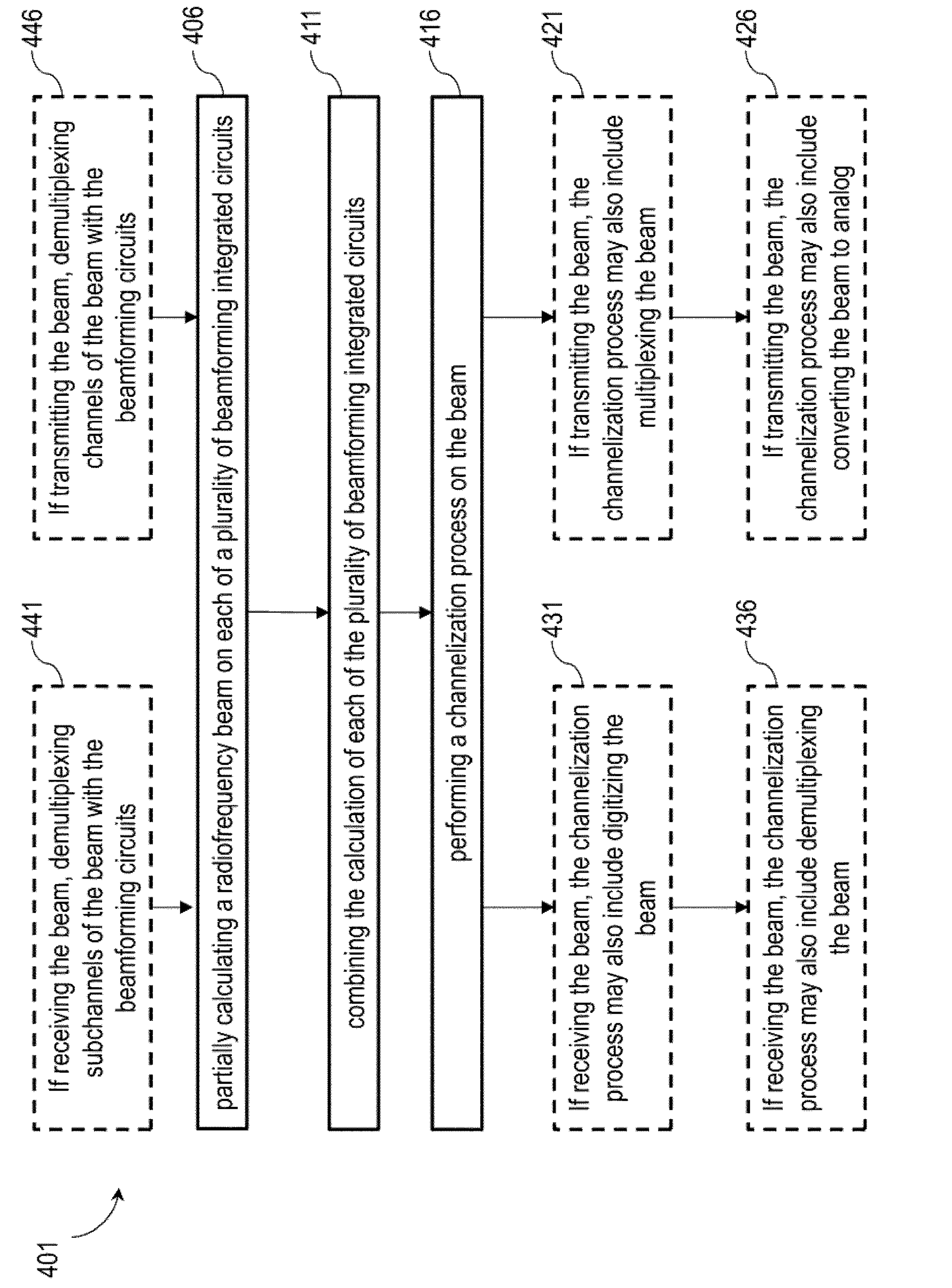
FIG. 4B is a flow chart of a method for distributed beamforming, according to an embodiment.

Referring to FIG. 4B, illustrated therein is a flow chart of a method for distributed beamforming, according to an embodiment. The method 401 includes partially calculating a radiofrequency beam on each of a plurality of beamforming integrated circuits, at 406. The method 401 also includes combining the calculation of each of the plurality of beamforming integrated circuits, at 411. The method 401 also includes performing a channelization process on the beams, at 416.

Optionally, if the method 401 includes receiving the beams, the channelization process 416 may also include digitizing the beams, at 431. The channelization process 416 may also include demultiplexing the beams, at 436.

Optionally, if the method 401 includes transmitting the beams, the channelization process 416 may also include multiplexing the beams, at 421. The channelization process 416 may also include converting the beams from a digital signal to an analog signal, at 426.

Optionally, if the method 401 includes receiving the beams, the method 401 includes demultiplexing subchannels of the beam with the beamforming circuits, at 441.

Optionally, if the method 401 includes transmitting the beams, the method 401 includes demultiplexing channels of the beams with the beamforming circuits, at 426.

Figure 5A:
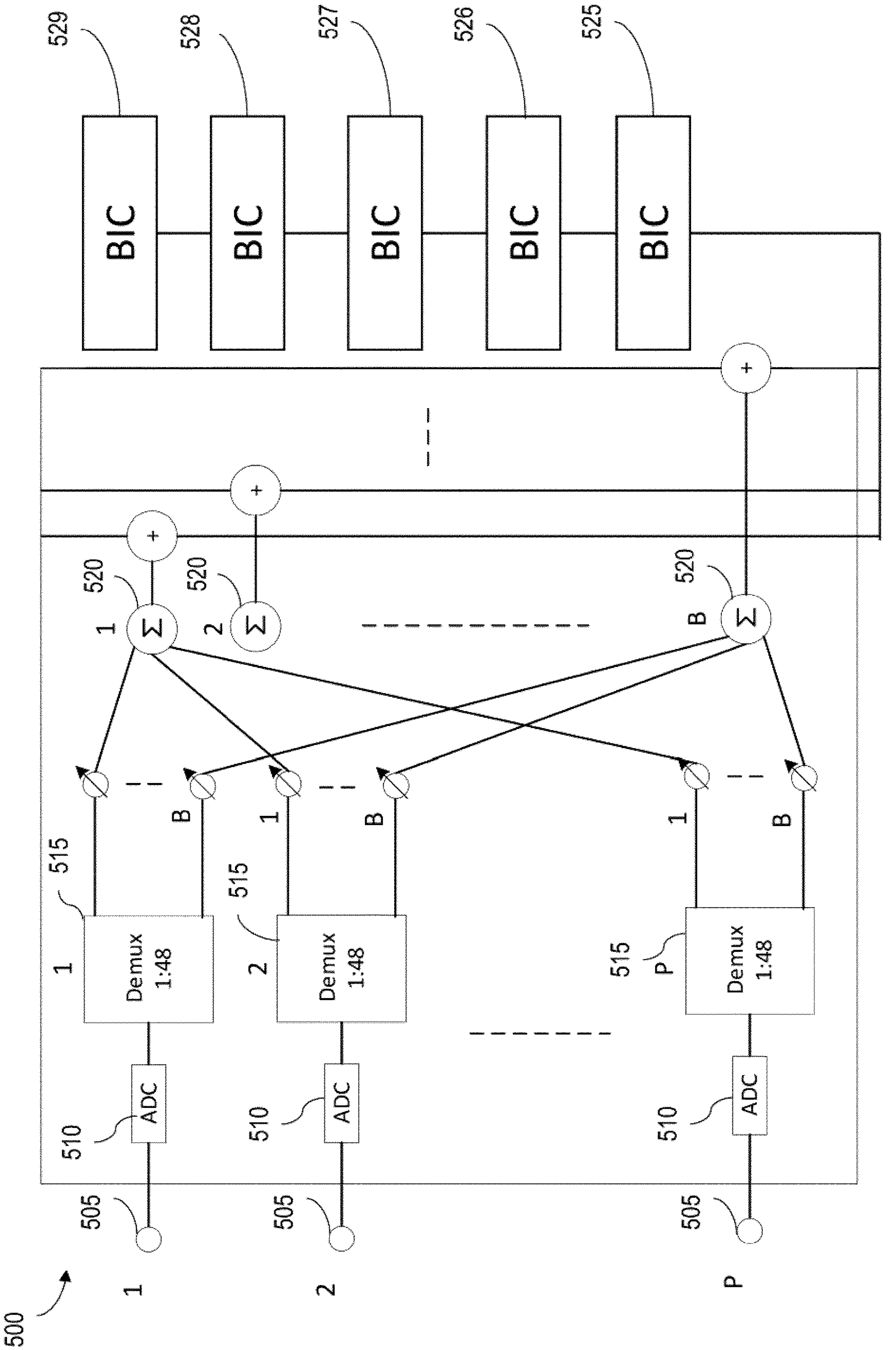
FIG. 5A is a block diagram of a beamforming integrated circuit 500 in an OBP for beamforming in a return link, according to an embodiment.

Referring to FIG. 5A, illustrated therein is a block diagram of a beamforming integrated circuit 500 in an OBP for beamforming in a return link, according to an embodiment. On the return link, the signals received from the antenna elements 505 are digitized by the analog to digital convertors 510, subchannels are demultiplexed at 515 and beams are formed by the plurality of beamforming integrated circuits. Any number of beams 520 may be formed by the beamforming integrated circuit 500. Each beamforming integrated circuit forms all of the beams 520 partially with the elements to which the beamforming integrated circuit is connected. The partially calculated beams 520 are passed to next beamforming integrated circuit 525. The beamforming integrated circuit 525 repeats the process from 500 and adds the partially calculated beam from by 525 to the partially calculated beams from 500 and passes the partially calculated beams to the next beamforming integrated circuit 526. The process of 500 is repeated in each of beamforming integrated circuits 526, 527, 528, and 529. In some embodiments, the beamforming integrated circuits are FPGA boards. While 6 beamforming integrated circuits are shown, any number of beamforming integrated circuits may be used greater than one. The last beamforming integrated circuit 529 passes the completely calculated beams to the channelization integrated circuit 501.

Figure 5B:
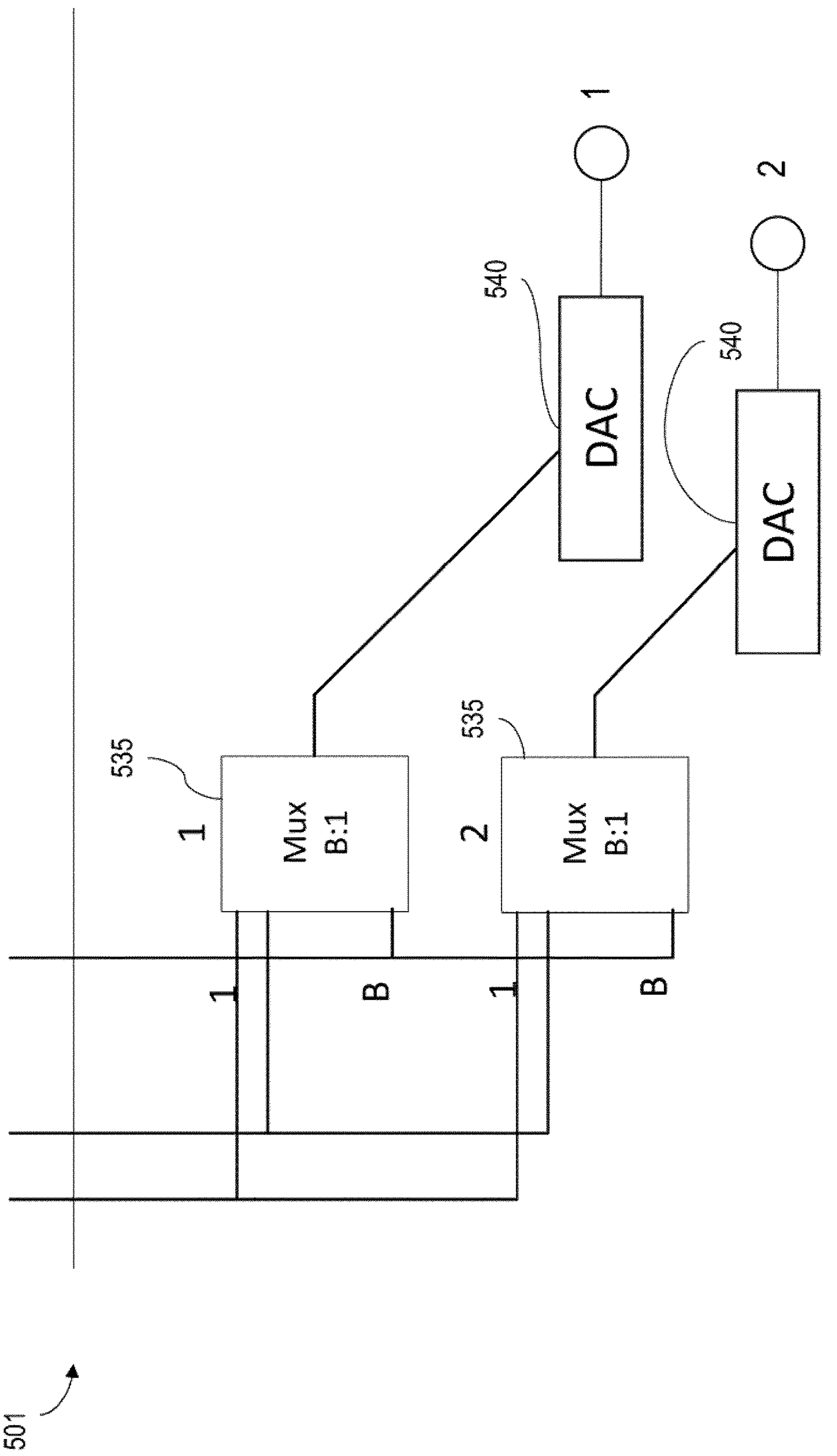
FIG. 5B is a block diagram of a channelization integrated circuit in an OBP for beamforming in a return link, according to an embodiment.

Referring to FIG. 5B, illustrated therein is a block diagram of a channelization integrated circuit 501 in an OBP for beamforming in a return link, according to an embodiment. The obtained beam signals from the plurality of beamforming integrated circuits are multiplexed at 535. Multiplexed beam signals are converted to analog by the digital to analog converter 540 and sent to the downlink. In some embodiments, the channelization integrated circuit processes, without limitation, C-band radiofrequency beams.

Figure 5C:
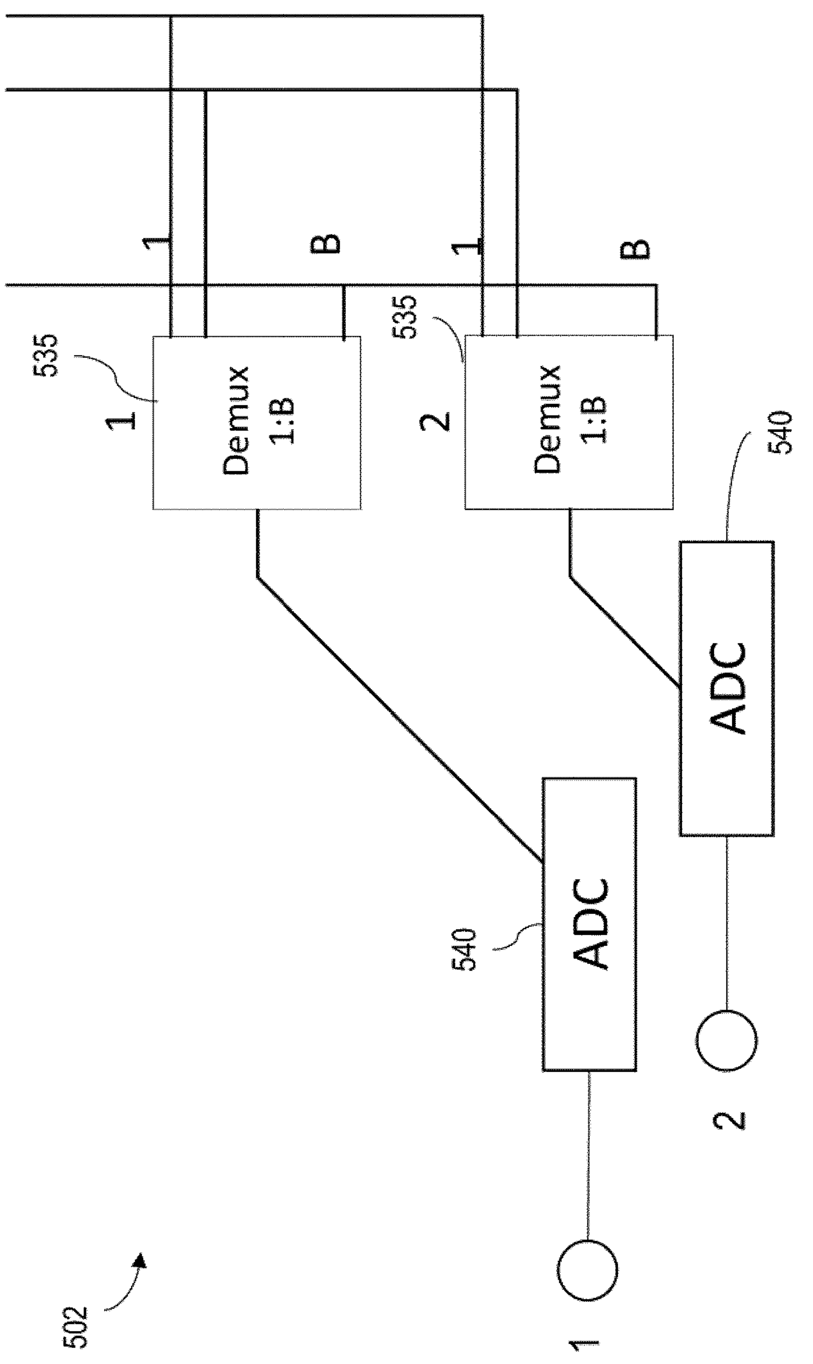
FIG. 5C is a block diagram of a channelization integrated circuit in an OBP for beamforming in a forward link, according to an embodiment.

Referring to FIG. 5C, illustrated therein is a block diagram of a channelization integrated circuit 502 in an OBP for beamforming in a forward link, according to an embodiment. The input radiofrequency signal that is received is digitized by the analog to digital converter 540. The digitized channels are demultiplexed at 535 and sent to the beamforming integrated circuit for beamforming.

Figure 5D:
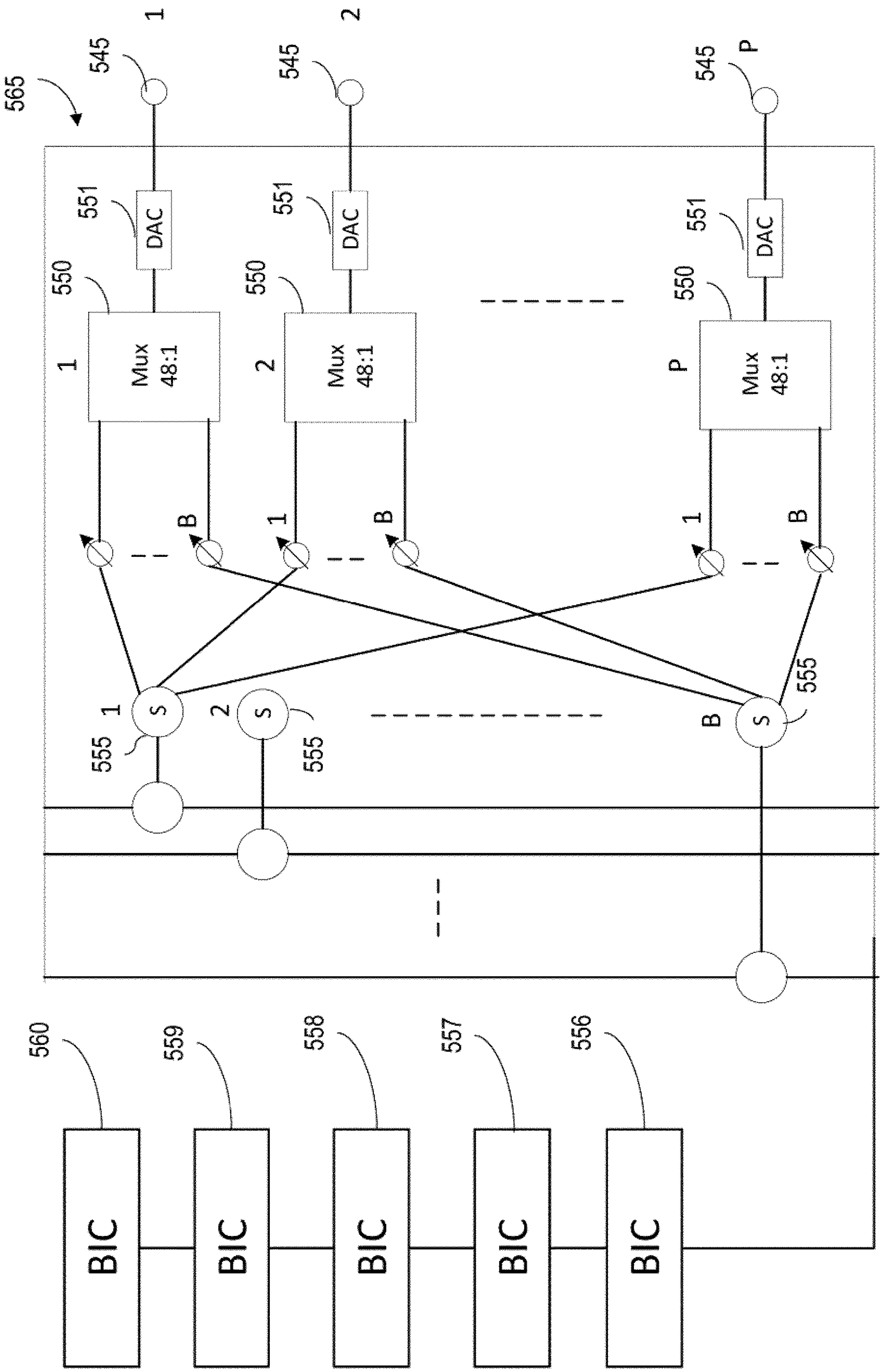
FIG. 5D is a block diagram of a beamforming integrated circuit in an OBP for beamforming in a forward link, according to an embodiment.

Referring to FIG. 5D, illustrated therein is a block diagram of a beamforming integrated circuit 565 in an OBP for beamforming in a forward link, according to an embodiment. The demultiplexed channels are sent to each of the plurality of beamforming integrated circuits 565, 560, 559, 558, 557, 556 for beamforming. Each of the plurality of beamforming integrated circuits 565, 560, 559, 558, 557, 556 partially form the beams 555 and provide the signals to the elements attached to the plurality of beamforming integrated circuits 565, 560, 559, 558, 557, 556. The partially formed beams 555 are multiplexed at 550 and then converted to analog by the digital to analog converter 551 and distributed to the transmit antenna radiating elements 545. The process of 565 is repeated in each of the beamforming integrated circuits 556, 557, 558, 559, 560.

Figure 6:
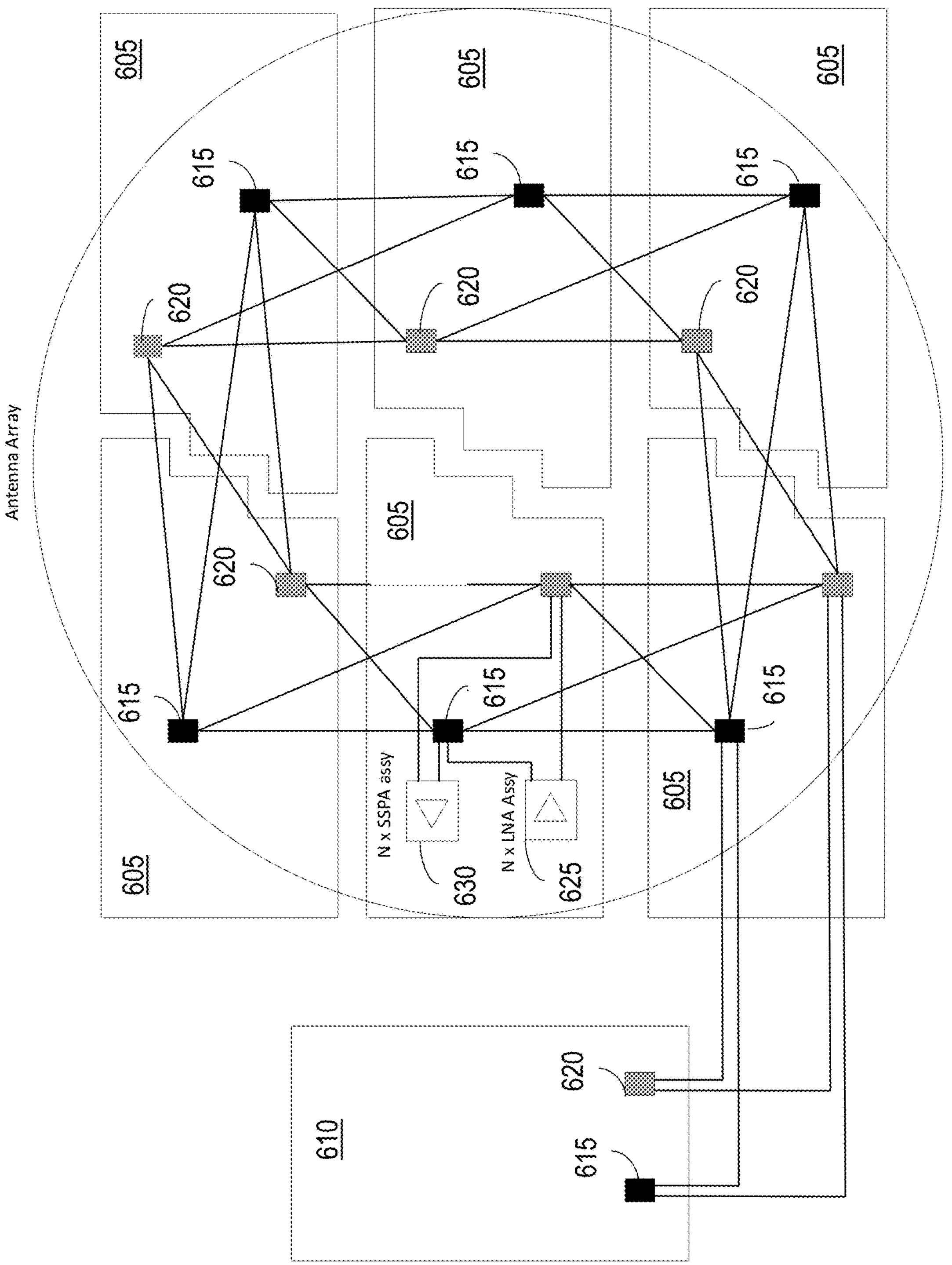
FIG. 6 is a block diagram of an OBP using a redundancy scheme, according to an embodiment.

Referring to FIG. 6, illustrated therein is a block diagram of an OBP using a redundancy scheme, according to an embodiment. The OBP includes six processor boards for beamforming 605 and one processor board for channelization 610. The redundancy is based on two rings of integrated circuits, such as FPGAs. The first ring is an active ring of FPGAs 615 and the second ring is a standby ring of FPGAs 620. Each FPGA is connected to the next active FPGA 615 and the next standby FPGA 620 for redundancy. The content of two connections is identical so if one active FPGA 615 fails, the information will be by-passed to the standby FPGA 620 without loss of functionality or performance. The FPGA may be substituted with any suitable integrated circuit. The active FPGAs 615 and the standby FPGAs 620 in the boards for beamforming 605 are communicatively connected to a LNA 625 for Rx signal amplification and a SSPA 630 for Tx signal amplification. Any number of LNAs and SSPAs may be connected to the active 615 and standby FPGAs 620 for signal amplification. In some embodiments, the active FPGAs 615 and the standby FPGAs 620 may be connected to 15 SSPAs and 15 LNAs.

Figure 7:
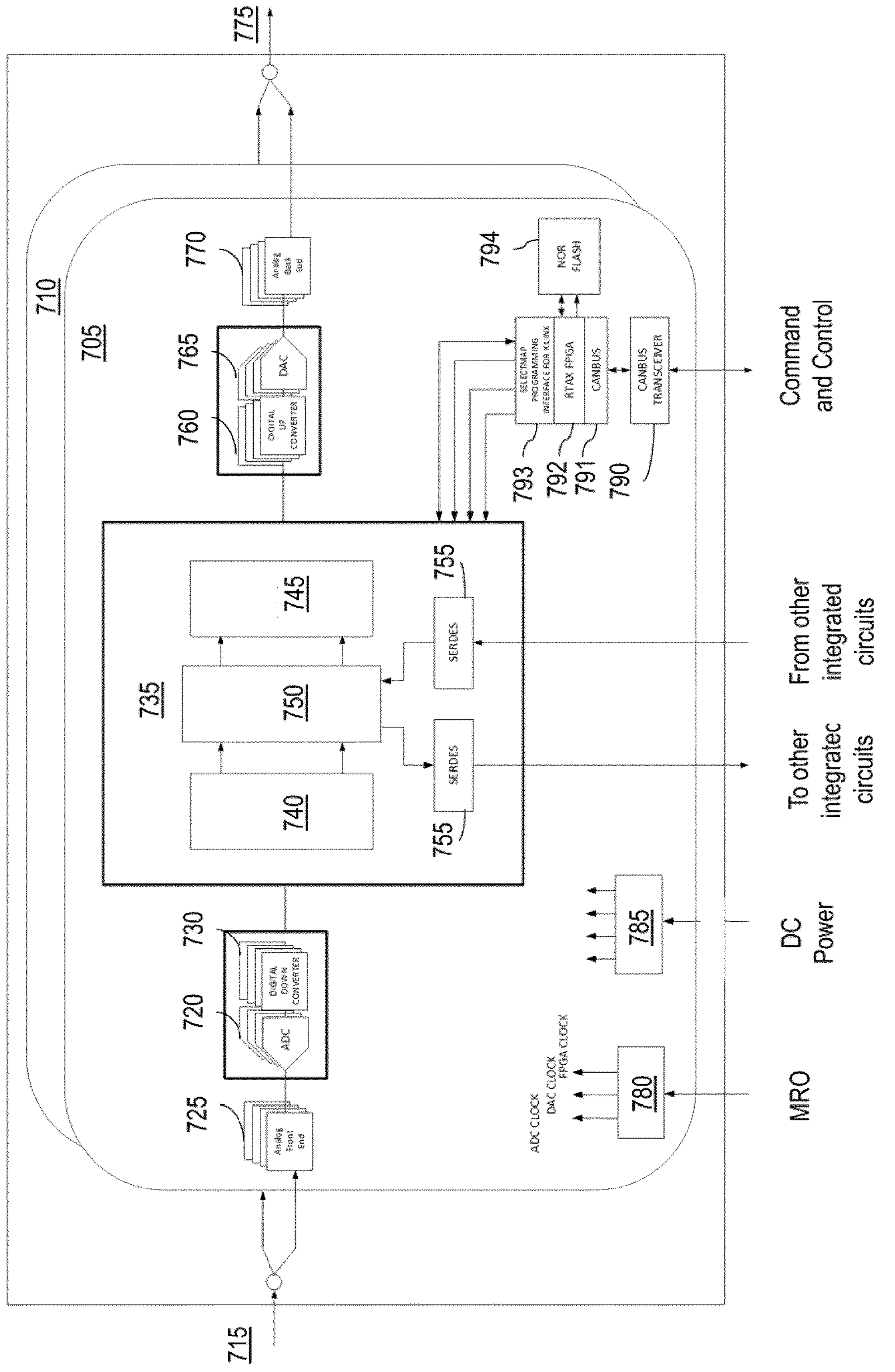
FIG. 7 is a block diagram of a radio frequency processor board, according to an embodiment.

Referring to FIG. 7, illustrated therein is a block diagram of a radio frequency processor board 700, according to an embodiment. The processor board 700 includes an active integrated circuit 705 and a redundant integrated circuit 710. The analog front end 725 of a receiving radiofrequency signal 715 is digitized by the analog to digital converter 720 and the digital down converter 730. The digitized signal is communicated to the integrated circuit 735, which may be an FPGA. The integrated circuit includes a receiving digital beamforming network module 740 and a transmitting beamforming module 745, for processing receiving and transmitting signals respectively. The integrated circuit includes a switch 750 for switching data processing from the receiving digital beamforming module 740 and a transmitting beamforming module 745. For the receiving signal, the data is sent to the serializer/deserializer (SerDes) 755 and sent to the other integrated circuits. In some embodiments, the receiving radiofrequency signal 715 may be, without limitation, an L-Band radiofrequency signal.

For transmitting a radiofrequency signals, the digitized signal is received by the transmitting beam forming module 745 from the other integrated circuits though a SerDes 755. The digitized signal is converted to analog by the digital down converter 760 and the digital to analog converter 765. The analog back end 770 signal is transmitted by the radiating elements as the transmitted signal 775. In some embodiments, the transmitting radiofrequency signal 775 may be, without limitation, an S-Band radiofrequency signal.

The processor board 700 also includes a phase locked loop (PLL) 780 for synchronizing the analog to digital clock, the digital to analog clock, and the integrated circuit clock. A master reference oscillator (MRO) provides the inputs for the PLL 780

The processor board 700 also includes DC power for providing power to the components of the processor board 700.

The processor board 700 also includes a controller area network vehicle bus (CANBUS) transceiver 790 for communication and control of the processor with command and control. A CANBUS interface 791 is used with the RTAX FPGA 792 to boot-up the FPGA integrated circuit 735. A programming interface 793 for controlling the FPGA integrated circuit is also provided. The RTAX FPGA is communicatively connected to a non-volatile memory 794 which stores the firmware for the FPGA integrate circuit 735.

In some embodiments, in-band command and telemetry is implemented to allow for fast OBP reconfiguration. The in-band command is used for sending the configuration and the telemetry is used to check that the command is successfully executed.

In some embodiments, where the integrated circuits are FPGAs, there is a large spare capacity in the FPGAs due to the relatively small bandwidth to be processed and the large computational resources available from the multiple integrated circuits. The spare capacity may be used to implement additional flexibility and capability to the payload such as, without limitation, beam hopping.

In some embodiments, all the functions are performed in the processor board's firmware. However, the functions may also be performed by a software program running on the processor.

While the above description provides examples of one or more apparatus, methods, or systems, it will be appreciated that other apparatus, methods, or systems may be within the scope of the claims as interpreted by one of skill in the art.

What is claimed is the systems and methods as generally and specifically described herein.

The invention claimed is:

1. A system for distributed beamforming, the system comprising:

an onboard processor for processing radiofrequency beams, the onboard processor further comprising:

a plurality of beamforming integrated circuits for beamforming the beams, wherein each of the plurality of beamforming integrated circuits are communicatively connected in a plurality of digital beamforming networks, wherein each of the plurality of beamforming integrated circuits is communicatively connected to multiple other beamforming integrated circuits of the plurality of beamforming integrated circuits, wherein each of the plurality of beamforming integrated circuits is communicatively connected to a respective subset of radiating elements, wherein each of plurality of beamforming integrated circuits is able to operate as an input and as an output for the respective subset of radiating elements and a channelization integrated circuit, wherein each of the plurality of beamforming integrated circuits performs calculations for partially forming the beams with its respective subset of radiating elements and communicates partially formed beam information to another of the beamforming integrated circuits for adding by the another of the beamforming integrated circuits, the another of the beamforming integrated circuits being a next beamforming integrated circuit in a digital beamforming network, wherein the plurality of beamforming integrated circuits perform calculations for completely forming the beams; and the channelization integrated circuit for applying a channelization process to the beams, wherein the plurality of beamforming integrated circuits are communicatively linked to the channelization integrated circuit.

2. The system of claim 1, wherein the channelization process further comprises:

digitizing the beams; and demultiplexing the beams.

3. The system of claim 1, wherein the beamforming integrated circuits are configured to demultiplex subchannels of the beams.

4. The system of claim 1, wherein the beamforming integrated circuits are configured to demultiplex channels of the beams.

5. The system of claim 1, wherein the channelization process further comprises:

multiplexing the beams; and converting the beams to analog.

6. The system of claim 1, wherein the plurality of beamforming integrated circuits includes at least one redundant beamforming integrated circuit.

7. A method for distributed beamforming, the method comprising:

partially calculating radiofrequency beams on each of a plurality of beamforming integrated circuits, wherein each of the plurality of beamforming integrated circuits are communicatively connected in a plurality of digital beamforming networks, wherein each of the plurality of beamforming integrated circuits is communicatively connected to multiple other beamforming integrated circuits of the plurality of beamforming integrated circuits, wherein each of the plurality of beamforming integrated circuits is communicatively connected to a respective subset of radiating elements, wherein each of plurality of beamforming integrated circuits is able to operate as an input and as an output for the respective subset of radiating elements and a channelization integrated circuit;

combining the calculation of each of the plurality of beamforming integrated circuits, wherein combining includes communicating partially calculated radiofrequency beam information to another of the beamforming integrated circuits for adding by the another of the beamforming integrated circuits, the another of the beamforming integrated circuits being a next beamforming integrated circuit in a digital beamforming network; and performing a channelization process on the beams.

8. The method of claim 7, wherein the channelization process further comprises:

digitizing the beams; and demultiplexing the beams.

9. The method of claim 7 further comprising demultiplexing subchannels of the beams with the beamforming circuits.

10. The method of claim 7 further comprising demultiplexing channels of the beams with the beamforming circuits.

11. The method of claim 7, wherein the channelization process further comprises:

multiplexing the beams; and converting the beams to analog.

12. The method of claim 7, wherein the plurality of beamforming integrated circuits includes at least one redundant beamforming integrated circuit.

13. A system for performing distributed digital beamforming, the system comprising:

radiating elements for transmitting radiofrequency beams;

a first digital beamforming integrated circuit of a plurality of beamforming integrated circuits communicatively connected in a plurality of digital beamforming networks, the first digital beamforming integrated circuit for generating a first partial beam information for a plurality of beams, wherein the first digital beamforming integrated circuit is communicatively connected to a first subset of the radiating elements for communication of the plurality of beams, wherein the first beamforming integrated circuit is communicatively connected to multiple other beamforming integrated circuits, wherein the first digital beamforming integrated circuit is able to operate as an input and as an output for the first subset of radiating elements and a channelization integrated circuit;

a second digital beamforming integrated circuit of the plurality of beamforming integrated circuits communicatively connected in a plurality of digital beamforming networks, the second digital beamforming integrated circuit for generating a second partial beam information for the plurality of beams, wherein the second digital beamforming integrated circuit is communicatively connected to a second subset of the radiating elements for communication of the plurality of beams, the second subset being different from the first subset, wherein the second beamforming integrated circuit is communicatively connected to multiple other beamforming integrated circuits of the plurality of beamforming integrated circuits, wherein the second digital beamforming integrated circuit is able to operate as an input and as an output for the second subset of radiating elements and a channelization integrated circuit, wherein the second digital beamforming integrated circuit is communicatively connected to the first beam forming integrated circuit to communicate the partial beam information to the first digital beamforming integrated circuit for adding by the first digital beamforming integrated circuit, the first digital beamforming integrated circuit being a next beamforming integrated circuit with respect to the second digital beamforming integrated circuit in a network of beamforming integrated circuits;

the first digital beamforming integrated circuit configured to generate complete beam information for a first beam of the plurality of beams using the first partial beam information for the first beam and the second partial beam information for the first beam; and the second digital beamforming integrated circuit configured to generate complete beam information for a second beam of the plurality of beams using the first partial beam information for the second beam and the second partial beam information for the second beam.

14. The system of claim 13, wherein the second digital beamforming integrated circuit sends second partial beam information of the first beam to the first digital beamforming integrated circuit.

15. The system of claim 13, wherein the first digital beamforming integrated circuit sends the first partial beam information for a second beam to the second digital beamforming integrated circuit.

16. The system of claim 13 further comprising a channelization integrated circuit for applying a channelization process to the plurality of beams, wherein at least one of the first digital beamforming integrated circuit and the second digital beamforming integrated circuit is communicatively linked to the channelization integrated circuit.

17. The system of claim 16, wherein the channelization process further comprises:

digitizing the beams; and demultiplexing the beams.

18. The system of claim 16, wherein the first digital beamforming integrated circuit and second digital beamforming integrated circuit are configured to demultiplex subchannels of the beams.

19. The system of claim 16, wherein the channelization process further comprises:

multiplexing the beams; and converting the beams to analog.

20. The system of claim 13, wherein the radiating elements are configured for transmitting the plurality of beams, and wherein the first digital beamforming integrated circuit and second digital beamforming integrated circuit are configured to demultiplex channels of the beams.

* * * * *